United States Patent
Schmidt

(10) Patent No.: US 7,624,535 B2
(45) Date of Patent: Dec. 1, 2009

(54) PLASTIC PLANT POT

(75) Inventor: Guido Schmidt, Dinklage (DE)

(73) Assignee: Gebr. Poeppelmann Kunststoffwerk-Wekzeugbau, Lohne (DE)

( * ) Notice: Subject to any disclaimer, the term of this patent is extended or adjusted under 35 U.S.C. 154(b) by 26 days.

(21) Appl. No.: 10/497,124

(22) PCT Filed: Sep. 13, 2002

(86) PCT No.: PCT/EP02/10295

§ 371 (c)(1),
(2), (4) Date: May 25, 2004

(87) PCT Pub. No.: WO03/045129

PCT Pub. Date: Jun. 5, 2003

(65) Prior Publication Data

US 2005/0005516 A1 Jan. 13, 2005

(30) Foreign Application Priority Data

Nov. 26, 2001 (DE) .............................. 201 19 165 U

(51) Int. Cl.
*A01G 9/04* (2006.01)
(52) U.S. Cl. .............................. 47/65.5; 47/65.6; 47/65; 47/66.6; 47/66.7; 47/65.7; 220/601; 220/676; 220/608; 206/423; 206/486; 206/562; 206/763; 206/564
(58) Field of Classification Search ................ 47/65.5, 47/65.6, 65, 65.7, 66.6, 66.7, 73, 63, 59 R, 47/79, 80, 71; D11/152–154, 145, 155, 156, D11/144; 206/423, 486, 562, 563, 763, 557, 206/564; 220/601, 676, 608; *A01G 9/04*
See application file for complete search history.

(56) References Cited

U.S. PATENT DOCUMENTS

D20,055 S * 7/1890 Whilldin ..................... D11/152
D20,663 S * 4/1891 Whilldin ...................... D20/24
1,391,353 A * 9/1921 Wells ............................. 47/71

(Continued)

FOREIGN PATENT DOCUMENTS

DE 3531268 A1 * 3/1987

(Continued)

*Primary Examiner*—Andrea M Valenti
(74) *Attorney, Agent, or Firm*—Porter, Wright, Morris & Arthur, LLP

(57) ABSTRACT

A flowerpot 1 made of plastic, in particular in a deep-drawn embodiment having a bottom 7 that is provided with holes and hollow layer regions of the bottom 7 on the bottom side for connecting the holes to the environment on the bottom side is designed so that the holes 12, 13 are arranged at least partially in the bottom areas 8, 9, 10, 11 which sit without any spacers for distancing on a supporting surface and have channels 14, 15 in the form of a bottom channeling crisscrossing through the lower area in at least two directions and leading out to the edges. These channels ensure drainage of the flowerpot at the bottom and optionally watering of the pot without providing feet or edge webs on the bottom that would be susceptible entanglement when being shifted on working surfaces or in conveyance with the help of conveyor belts and which can lead to deformation and resilient recoil movements when work is done by machine, in particular when the pots are being placed on a substrate.

18 Claims, 3 Drawing Sheets

U.S. PATENT DOCUMENTS

Figure 1:
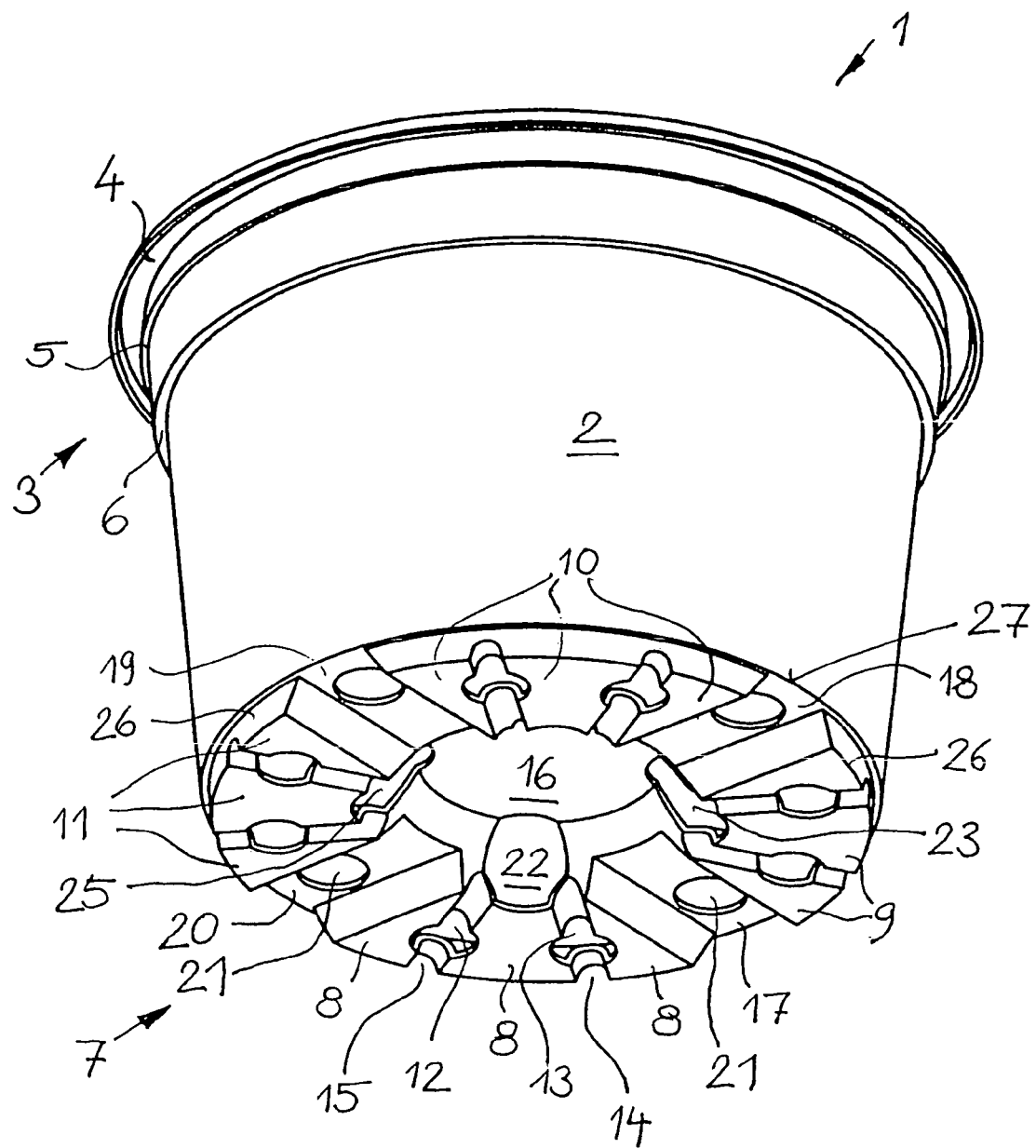

| | | | | |
|---|---|---|---|---|
| 3,315,410 A | * | 4/1967 | French | 47/65.7 |
| 4,173,097 A | * | 11/1979 | Staby | 47/65.5 |
| 5,459,960 A | * | 10/1995 | Manlove | 47/65.5 |
| 5,761,848 A | * | 6/1998 | Manlove | 47/65.5 |
| 5,870,855 A | * | 2/1999 | Hougaard | 47/65.5 |
| 6,134,832 A | * | 10/2000 | Bokmiller et al. | 47/66.1 |
| 6,510,653 B1 | * | 1/2003 | Workum et al. | 47/65.5 |
| D505,882 S | * | 6/2005 | Hensen | D11/152 |

FOREIGN PATENT DOCUMENTS

| | | | |
|---|---|---|---|
| DE | 4000950 A1 | * | 7/1990 |
| DE | 9308219.3 | * | 7/1993 |
| DE | 29918043 U | * | 10/1999 |
| EP | 0724826 A1 | * | 8/1996 |
| JP | 2002186362 A | * | 7/2002 |
| NL | 1000938 C | * | 8/1995 |
| WO | WO2004/006651 | * | 6/2003 |

* cited by examiner

PLASTIC PLANT POT

This invention relates to a flowerpot according to the definition of the species of claim 1.

Flowerpots made of plastic such as those used on a very large scale in commercial gardening have been highly developed with regard to various goals. In addition to the usual requirements, i.e., that the flowerpot should be suitable for mass production, e.g., by injection molding or deep drawing, lightweight, sparing use of materials as well as being grippable and having dimensional stability despite the use of thin walls, there are also requirements regarding good stackability, good machine handling and especially from a gardening standpoint, good waterability, drainability and ventability.

Holes are provided in the bottoms of the pots for rapid and complete drainage, which is necessary in commercial gardening operations, whether the water is sprayed from above or with a so-called ebb and flow watering method as well as for ventilation from beneath. The bottom itself is traditionally elevated by means of webs at the edge, ribs or molded feet which extend down from the bottom like a bead or bulge so that the holes in the bottom are not sealed up when the pot is placed on a supporting surface, thus resulting in poor (watering and) drainage, and especially in poor ventilation. Instead the holes on the bottom are kept clear.

However, especially with flowerpot bottoms that are designed to be thinner and thinner in order to save on materials, it has been found that they pose problems in handling. Thus the edge webs or feet provided as distancing means are susceptible to becoming entangled in conveyor belts, especially in the transfer from one belt to another. In addition, transverse movements of the thin-walled pots on a sliding surface are also made difficult by such feet or edge webs. When the flowerpots are set down by machine on a solid substrate, e.g., when they are being unstacked, this results in elastic recoil movements which are difficult to control and lead to interference and reduce the working speed.

Starting from a flowerpot according to the definition of the species of claim 1, this invention remedies this with an embodiment according to the characterizing part of the claim. In this embodiment, the flowerpot as a whole—e.g., in the case of a profiled bottom—does not have its own stand at the bottom and/or by way of by having feet or bottom webs in its lowest areas to serve as a stand and keep it clear of the supporting surface. The bottom and its lowest areas are direct contact areas.

Now, however, to accomplish this, so that excess water present in the pot or supplied from above can run off rapidly and completely, the lowest regions of the bottom must be provided with holes, and these holes must not be covered at the bottom by the supporting surface. The latter is ensured by the fact that channels in the form of bottom channeling running through the holes and leading from the edge out of the area. Water can thus escape through the holes and flow downward and flow outward beneath the edge. In addition, however, especially with these bottom holes, adequate ventilation, i.e., good air access to the bottom holes, must be ensured. This is facilitated by designing the channels to be continuous in at least two directions. If the channels were continuous in only one direction, e.g., from the hole to the edge, water adhering by capillary action might still be retained. In particular, however, ventilation beneath the hole, which would ensure adequate air access, would be difficult.

From a mechanical standpoint, such a pot having a bottom without any standing feet or webs has proven to be very advantageous. As expected, conveyance problems no longer occur when the pots are shifted or conveyed on belts. The bottom, which stands upright and covers a large area, also does not tend to recoil or rebound when the pots are unstacked or when they are set down by machine on a setup area. Moreover, with a comparable overall height, this yields a gain in volume because the area that was previously kept clear beneath the bottom is omitted and can now be included with the interior. Conversely, the height of the pot can be reduced at a given volume accordingly.

Figure 2:
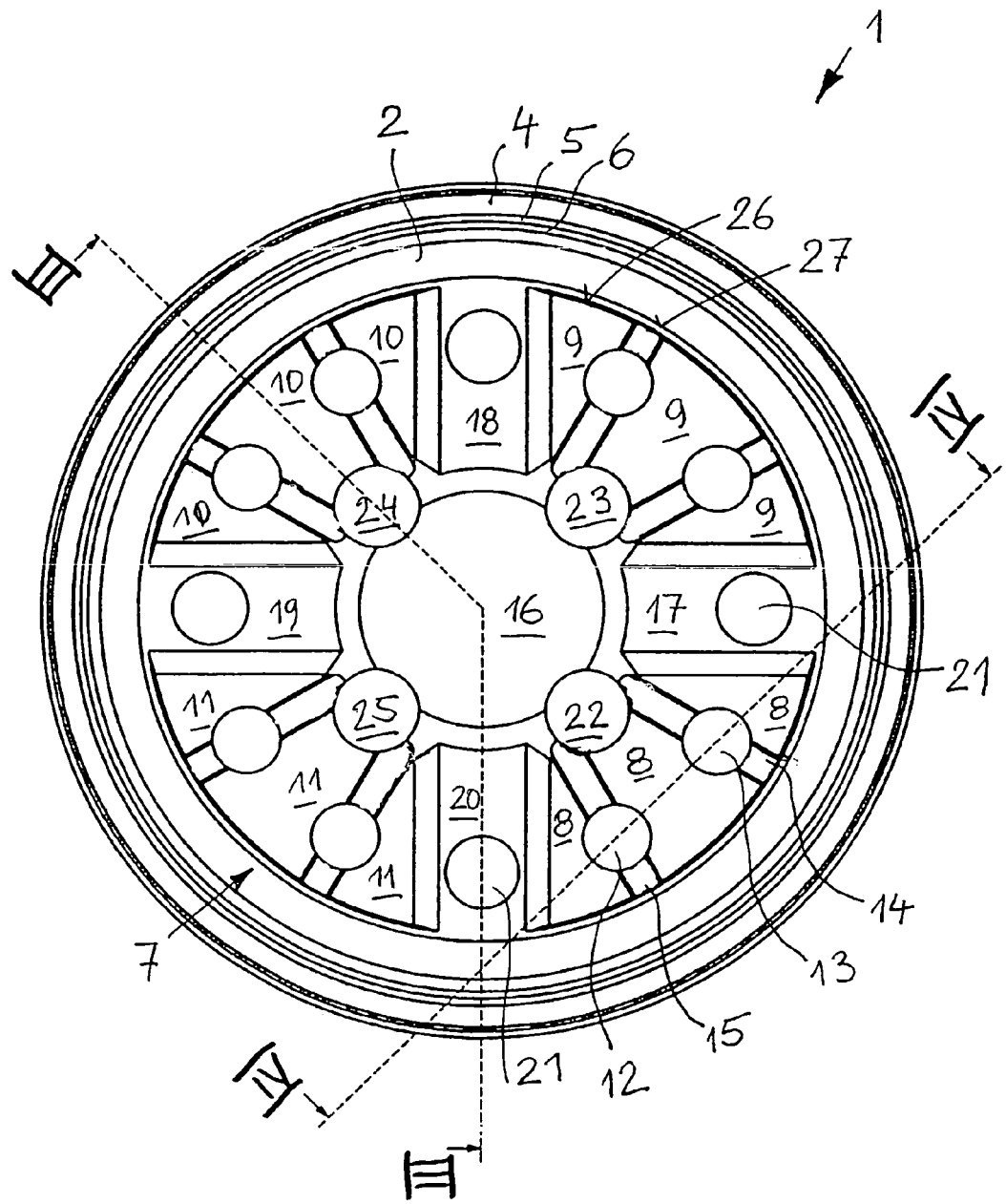
Figure 3:
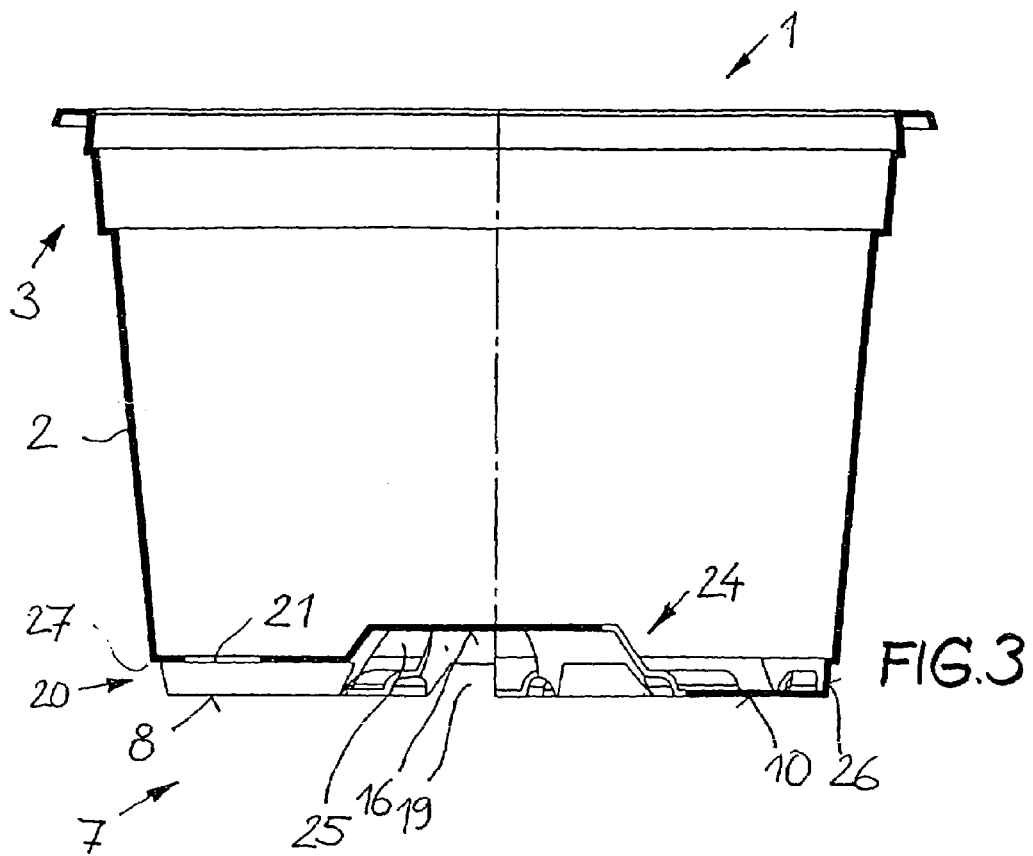

An exemplary embodiment of this invention is depicted in the drawing and described in greater detail below. The drawing shows:

FIG. 1 a view of a flowerpot as seen obliquely from underneath,

FIG. 2 a view of the flowerpot according to FIG. 1 as seen from underneath,

FIG. 3 a section along line III-III in FIG. 2, and

Figure 4:
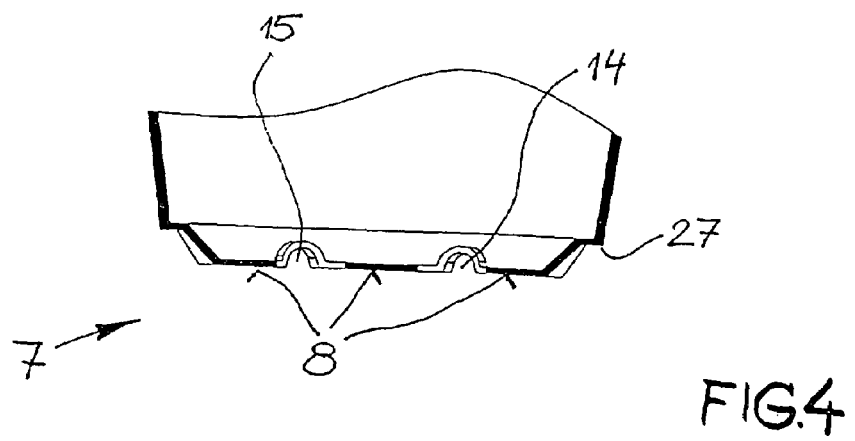

FIG. 4 a section along line IV-IV in FIG. 2.

The flowerpot, labeled as 1 on the whole in the drawing, is in the shape of a truncated cone, usually with a cone angle of 5° to 8° in the area of a wall 2, which is provided with an edge area 3 toward an opening at the top, said edge area having a flange 4 and shoulders 5, 6 for reinforcement, for handling and for establishing a predetermined stacking distance.

At the bottom, the flowerpot 1 is provided with a bottom 7 having profiling. The shape of the bottom has four sector-shaped bottom areas 8, 9, 10, 11 which form the lowest regions of the bottom and sit flatly on a surface.

These bottom areas 8, 9, 10, 11 are each provided with holes 12, 13 so that the lowest interior spaces of the pot directly above these bottom areas 8, 9, 10, 11 can be drained in a sprinkler watering process or in ebb and flow watering. To ensure a flow of water outward through the holes, they have a bottom channeling which is hollow at the bottom and crisscrosses through the bottom in the form of channels 14 and/or 15 that face downward and lead outward toward the edges. In particular the short and direct path to the edge is advantageous here, approximately equivalent to the radial path in the case of a round flowerpot.

However, the channels 14, 15 not only lead to the edge in one direction but also lead in the opposite direction to an elevated central area 16 of the bottom 7 so that the channels have a horizontal passage. This ensures that when the pots are standing on an incline, for example, water can still flow out even when the adjacent edge is higher. The continuity of the channels 14, 15 also prevents water from being retained by capillary action or due to lack of pressure equalization. In particular, however, the continuity of the channels ensures ventilation to the pot with a free horizontal exchange of air.

As shown in FIG. 4 in particular, the channels 14, 15 have a rounded and sufficiently high, approximately semicircular cross section. For the function of the channels, it is important for the height dimension to be enough to ensure an exchange of air and water. The height of the channels preferably corresponds to at least half the channel width.

A so-called "bottom cross," i.e., with hollow ribs 17, 18, 19 and 20 running out freely to the edge radially from the center area 16, yields more extensive profiling of the bottom next to the bottom areas 8, 9, 10 and 11, which are in turn further subdivided by the channels 14, 15, and the middle area 16, thereby increasing the dimensional rigidity of the bottom between two such sectors 8, 9, 10 and 11, and also each is provided with a drainage hole, e.g., a drainage hole 21 of the bottom rib 17.

Because of its great size, four holes 22, 23, 24 and 25 are especially advantageous for drainage of this pot; these holes are not arranged in a flat or planar bottom area like the other holes but instead are situated in an offset region between two bottom planes. Here they are situated in the steep, almost vertical bottom parts which connect the lowest bottom regions 8, 9, 10, 11 with the middle region 16. In such bottom parts, which are set up as walls, the holes can be designed to be relatively large because the weight of the pot filling such as soil or substrate in the pot acts approximately parallel to the surface of the hole and because the pressure exerted by machine or by hand in planting is applied essentially from the top and thus puts little pressure on these holes.

The profiled bottom does not show a direct transition from its deep bottom regions 8, 9, 10, 11 to wall 2; instead, console strips 26 and a step edge 27 are provided here, first improving the cross-sectional rigidity and secondly providing a clear visual closure of the bottom with the wall 2.

As a result, the bottom area is provided with a large lower surface formed by the bottom areas 8, 9, 10, 11 with all the profiling. This ensures that the pot will sit securely on a surface while preventing flexible yielding movements or elastic recoil when the pots are set down by machine and also in particular eliminates the need for webs and feet which can become entangled in the conveyor means such as conveyor belts or catching at transitions or joints.

The invention claimed is:

1. A flowerpot (1) made of plastic, said flowerpot comprising a bottom (7) provided with hollow bottom regions forming a planar bottom engagement surface to rest directly on a supporting surface and holes to join an interior of the hollow bottom regions to the environment, wherein the holes (12, 13) are formed at least partially in the bottom regions (8, 9, 10, 11) at the engagement surface and rest on the supporting surface without any spacers for distancing and are permeated by channels (14, 15) that lead out to the edges of the bottom, and wherein one of the channels extends in two opposite directions from one of the holes to the edges of the bottom so that continuity of a horizontal passage formed by the channel ensures ventilation with a free horizontal exchange of air through the bottom of the hole and the channel and has a height at least equal to half the width of the channel to ensure simultaneous exchange of air and water.

2. The flowerpot according to claim 1, wherein the channels (14, 15) are mainly aligned radially.

3. The flowerpot according to claim 2, wherein the channels (14, 15) open into a central hollow region.

4. The flowerpot according to claim 3, wherein the width of the channels (14, 15) is at least partially smaller than the width of the holes.

5. The flowerpot according to claim 4, wherein the bottom has some bottom areas (16, 17, 18, 19, 20) which are at a higher level than the bottom regions (8, 9, 10, 11) which are placed on a supporting surface without any spacers for distancing.

6. The flowerpot according to claim 5, wherein the bottom regions and bottom areas (8 through 11, 16 through 20) which are at different levels are connected by bottom sections having a steep alignment with drain holes (22, 23, 24, 25).

7. The flowerpot according to claim 6, wherein the bottom is provided with profiling that is opened to the outside at the bottom and is set back from a wall (2) of the flowerpot with a step edge (27).

8. The flowerpot according to claim 1, wherein the channels (14, 15) open into a central hollow region.

9. The flowerpot according to claims 1, wherein the width of the channels (14, 15) is at least partially smaller than the width of the holes.

10. The flowerpot according to claim 1, wherein the bottom has some bottom areas (16, 17, 18, 19, 20) which are at a higher level than the bottom regions (8, 9, 10, 11) which are placed on a supporting surface without any spacers for distancing.

11. The flowerpot according to claim 10, wherein the bottom regions and bottom areas (8 through 11, 16 through 20) which are at different levels are connected by bottom sections having a steep alignment with drain holes (22, 23, 24, 25).

12. The flowerpot according to claim 1, wherein the bottom is provided with profiling that is opened to the outside at the bottom and is set back from a wall (2) of the flowerpot with a step edge (27).

13. The flowerpot according to claim 1, wherein the bottom has some bottom areas (16, 17, 18, 19, 20) located higher than the bottom engagement surface formed by the bottom regions (8, 9, 10, 11) and the bottom areas are provided with openings (21) that are spaced above the support surface.

14. The flowerpot according to claim 1, wherein the width of the channels (14, 15) is smaller than the width of the holes at the intersection of the channels and the holes.

15. The flowerpot according to claim 1, wherein the one of the channels extending in two directions is sized and shaped to prevent water from being retained by capillary action.

16. The flowerpot according to claim 1, wherein the one of the channels extending in two directions is approximately semicircular in a vertical cross section.

17. The flowerpot according to claim 1, wherein the one of the channels extending in two directions is sized and shaped to prevent water from being retained due to lack of pressure.

18. The flowerpot according to claim 1, wherein the two opposite directions are aligned to form a straight horizontal passage between the edges of the bottom.

* * * * *

UNITED STATES PATENT AND TRADEMARK OFFICE
CERTIFICATE OF CORRECTION

PATENT NO.        : 7,624,535 B2                                           Page 1 of 1
APPLICATION NO.   : 10/497124
DATED             : December 1, 2009
INVENTOR(S)       : Guido Schmidt It is certified that error appears in the above-identified patent and that said Letters Patent is hereby corrected as shown below:

On the Title Page, Item (73) the Assignee on the issued patent is listed as Gebr. Poeppelmann Kunkstoffwerk-Wekzeugbau, Lohne (DE).
The correct Assignee should read Poeppelmann Holding GmbH & Co. KG, Lohne (DE).

Signed and Sealed this

Twenty-first Day of December, 2010

David J. Kappos
*Director of the United States Patent and Trademark Office*